April 19, 1955 E. T. OLSON 2,706,646
COUPLER FOR HYDRAULIC LINES
Filed July 2, 1951

INVENTOR.
ELMER T. OLSON
BY
Carlsen & Hoyle
ATTORNEYS

United States Patent Office 2,706,646
Patented Apr. 19, 1955

2,706,646

COUPLER FOR HYDRAULIC LINES

Elmer T. Olson, Minneapolis, Minn.

Application July 2, 1951, Serial No. 234,767

4 Claims. (Cl. 284—18)

This invention relates to improvements in couplers for lines or conduits carrying fluid under pressure and by means of which such lines may be connected or disconnected at will and without the escape of fluid.

A coupler of this general type is disclosed in my prior co-pending application Serial No. 103,577 filed July 9, 1949, for Coupler for Fluid Lines, and the present application constitutes a continuation-in-part from that earlier application. The coupler comprises two main body parts of generally tubular shape with means for connecting them in end to end relation, the adjacent ends being formed with seats with which cooperate check balls, and the opposite ends having means for connection to the fluid lines or conduits to be coupled. When these body parts are uncoupled the check balls protrude and in such position seal around their seats to prevent the escape of fluid, the balls being urged to their seats by coil springs in the parts. As the parts are then brought together the balls abut each other and force each other away from their seats allowing the fluid to flow as the lines are coupled together.

As emphasized in my prior application the use of such self-unseating check balls in couplers of this kind requires that means be provided to hold the balls on center, or on the axes of the bores through the body parts, so that a maximum and uniform space will be provided for the fluid to pass around the balls and through the seats. Furthermore, the balls must be equally spaced from their respective seats when the parts are coupled together. Unless these two requirements are met the coupler will not be satisfactory, due to the resulting restriction and the creation of turbulence in the flow, and this problem becomes increasingly acute at the higher fluid pressures now so prevalent. In that prior application the balls are centered and stopped at equal distances from their seats by stationary ball stop and centering members secured in the body parts and the resulting construction is probably as simple and effective as is possible.

I find, however, that this structure may be varied with a possible advantage in assembling the coupler by the use of a stationary ball centering and stop member in only one of the body parts and a movable, spring biased and axially guided member in the other, mating part of the coupler, and it is the primary object of my present invention to provide such a coupler as a logical continuation from my previous disclosure. Where both stops are stationary it naturally follows that both must be accurately assembled into the coupler parts in order to properly stop and center the check balls without interfering with the coupling of the parts together, and while such accuracy is by no means impossible, as proven by extensive actual practice, it does entail a certain amount of care and precision in the work. As a further important object of my present invention I therefore provide a movable ball stop and centering member of such nature that when used in one part of the coupler it will result in the extremely accurate centering of the balls and equal spacing thereof from their seats, in cooperation with one of the stationary members in the mating part of the coupler. Thus the accurately positioned stationary member in the one part will control the stopping of both balls, and the assembly of the parts will be materially facilitated.

These and other more detailed and specific objects will be disclosed in the course of the following specification, reference being had to the accompanying drawings, in which—

Figure 1:
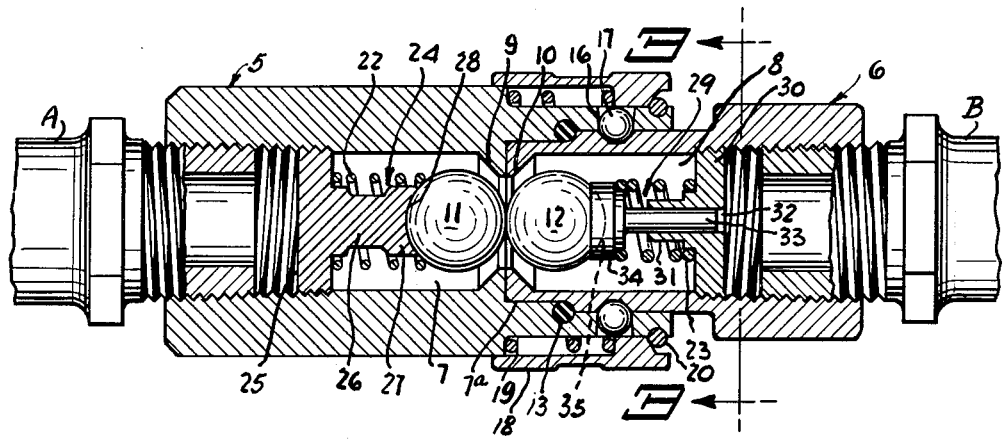
Fig. 1 is a longitudinal diametrical sectional view through a coupler according to my present invention, showing the coupler parts connected and with fittings for the lines to be coupled.
Figure 2:
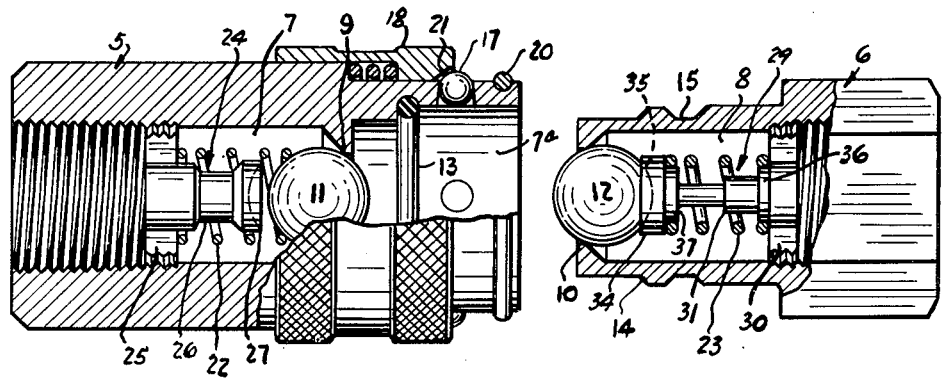
Fig. 2 is a similar view with the coupler parts uncoupled and with certain parts in elevation to better disclose the combination.

Referring now more particularly and by reference characters to the drawing, the coupler according to my invention comprises complementary main body parts which are designated generally at 5 and 6. These body parts are cylindrical or tubular in general shape and have bores 7 and 8 respectively which extend through from end to end. At one end the bore 7 through the body part 5 is diametrically enlarged for a portion of its length 7ª to accommodate the corresponding extremity of the body part 6 when the parts are coupled together as shown in Fig. 1, and thus the part 5 acts as a receptacle for the tip part 6. At the outer ends the bores 7 and 8 are interiorly threaded to accommodate any suitable type of fittings A and B by which the coupler parts may be connected to the hydraulic lines or conduits to be coupled together. When so connected it is obvious that fluid in such lines will enter the bores 7 and 8 and the extremity of the tip part 6, as well as the junction between the portion 7 and 7ª of the bore 7 are both diametrically reduced to form seats 9 and 10 with which check balls indicated at 11 and 12 cooperate to close against these seats when the parts are uncoupled as seen in Fig. 2. The adjacent ends of the bores 7 and 8 are thus diametrically reduced and the balls 11 and 12 are of such diameter that they will protrude peripherally through these reduced openings, as also clearly shown in Fig. 2. Thus as the coupler parts 5 and 6 are brought together the balls 11 and 12 will abut and unseat each other, as seen in Fig. 1, permitting fluid to flow around the balls and through the bores when the lines are coupled together.

Fluid escape when the lines are coupled is prevented by means of an O ring 13 arranged in a groove in the portion 7ª of the bore in the body part 5 and abutting a shoulder 14 around the periphery of the tip part 6. To releasably hold the coupler parts in their coupled relation the tip part is provided with a shallow annular groove 15 having sloping sides, and this groove will register with a plurality of radial apertures 16 in the surrounding end of the part 5, which apertures loosely accommodate an equal number of detent balls 17. This end of the part 5 is reduced in diameter to slidably accommodate a retaining collar 18 which is interiorly chambered out to slide over the larger diameter of the part 5 and to accommodate a spring 19 which urges the collar to the right as viewed in the drawing. This motion is limited by a snap ring 20 and in the normal position the collar 18 forces the detent balls 17 inward into the groove 15 thus holding the parts assembled. The operator may, however, grasp the collar 18 and pull it to the left against the resistance of the spring 19 to the position shown in Fig. 2, whereat the internally chamfered end 21 of the collar will register with the detent balls 17, allowing them to move outward clear of the groove 15 so that the body parts may be pulled apart.

Figure 3:
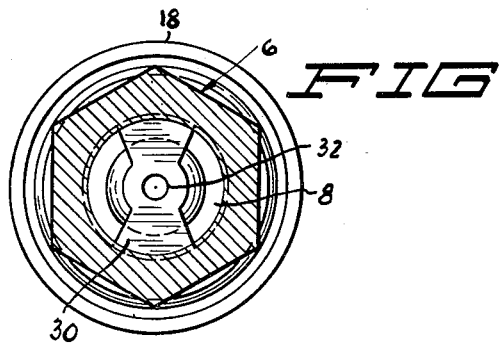
Fig. 3 is a cross section along the line 3—3 of Fig. 1.

Thus far the coupler is essentially identical to the coupler disclosed in my prior application previously identified, and it will, of course, be clear that the check balls 11 and 12 will close off the ends of the coupler parts when they are disconnected in order to prevent the escape of fluid from the lines, and that the balls will have a self-unseating action to open up the lines when the coupler parts are brought together. Also in common with my prior application, the balls 11 and 12 are urged to their seats by means of expansion coil springs 22 and 23, and the specific arrangement of these springs will be presently made clear. In order to permit fluid flow with a minimum of restriction and turbulence it is an absolute necessity that the balls 11 and 12 be centered on the axes of the bores 7 and 8 while fluid is flowing, and it is furthermore very important that the balls be equally spaced from their respective seats 9 and 10 as they are shown in Fig. 1. In my prior application I provided each coupler part with a stationary ball centering and stop member, and in the present instance one of such elements appears in the part 5 where it is designated generally at 24. This element or member 24 comprises an end portion 25 externally threaded for a tight fit into the threaded end of the bore 7, and from this end 25 there axially extends an integral stem 26 terminating in an enlargement 27 having a concaved end face 28 facing the ball 11. The aforesaid spring 22 is placed about the stem 26 where it is braced between the ball 11 and the end 25 thus to normally thrust the ball tightly to its seat 9. The concaved face 28 is so spaced with reference to the seat 9 that as the ball 11 is forced away from the seat by the opposite ball it will contact this face 28 in order to halt further motion of the ball 11 and to center the same on the axis of the bore 7 as will be clearly evident. In the previous disclosure the end 25 was circular in shape and provided with suitable ports for the passage of the fluid, but in the present instance this end is "spoke" shaped, as seen in Fig. 3, with its opposite extremities threaded for mounting it into the body part, the latter shape having the advantage of a minimum restriction to fluid passage as will be apparent.

As stated in my previous disclosure two of the ball centering members or elements 24 were provided and identically arranged in the mating body parts so that both of the check balls were accurately centered and equally spaced from their seats, and while that construction is undoubtedly as simple and effective as could be provided, it does have the disadvantage that both, or all, of such members 24 must be very accurately positioned in the coupler parts during the assembly thereof. Such precision and assembly is completely practical but may be effectively reduced by the use of but one of the stationary members 24, and the use of a modification thereof, as designated generally at 29, for the other body part. As here shown this modified ball centering and stop member 29 is provided in the tip part 6, but it may be placed in the other part 5 and a stationary member used in the tip if so desired.

The member 29 comprises an end 30 identical to the corresponding end portion 25 previously described and also externally threaded at its ends to screw into the body part 6 to act as a stationary guide. In this case, however, this end 30 is provided with a short sleeve portion 31 extending toward the associated ball 12 and has an axial bore 32 for the slidable accommodation of a guide stem 33 forming part of a ball engaging follower 34. The latter has a concaved end face 35 to engage the ball 12 and the aforesaid spring 23 is braced between the follower 34 and the end 30 so as to thrust both the follower and the ball 12 toward the seat 10. The spring 23 is engaged over annular shoulders 36 and 37 formed upon the end 30 and follower 34 as clearly shown.

It will be seen from the foregoing that this ball centering and stop member 29 is movable in part, although it is axially guided so that the ball 12, as engaged by the follower 34, will at all times be held accurately centered on the axes of the bores through the body parts of the coupler. The spring 23, as indicated in the drawing, is much heavier than the spring 22, and thus when the coupler parts are assembled the ball 12, as held by this heavier spring 23, will first completely thrust the ball 11 home against the end 28 of the stationary member 24 at which point then the spring 23 will necessarily be compressed as the coupler is brought fully together so that the ball 12 is also pushed off its seat 10. It will be seen therefore that while the ball 12 is in a sense movably supported, it will at all times be accurately spaced from its seat 10 to the same distance as the ball 11 from its seat 9, due to the fact that the stationary stop member 24 controls the position of both of the check balls. It will be further evident that the movable ball centering member 29 need not be as accurately positioned in the coupler as the stationary member 24 since considerable leeway will be provided by the telescopic connection between the stem 33 and bore 32 without in any way interfering with the accuracy with which the balls are both centered and stopped.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. A coupler for releasably connecting hydraulic fluid conduits comprising, a pair of disconnectable body members having tubular bores extending longitudinally therethrough and disposed end to end with the bores in communicating alignment, means releasably connecting the adjacent end portions of the body members to retain them in fixed alignment and seal them against the escape of fluid from between the communicating ends of the bores, the adjacent ends of the bores each having a valve seat of lesser diameter than the bore, a pair of valve balls disposed one in each of the bores adjacent the respective seats for projecting therethrough and closing thereagainst to prevent the escape of fluid from the conduits when the body members are disconnected, said valve balls being operative by contact pressure between their projected portions, when the body members are being connected, to unseat each other from their respective valve seats, springs urging the balls toward the respective valve seats, a pair of ball stop members having threaded base portions screwed into the outer end portions of the respective bores so as to be rigidly stationary therein, a stem portion extending rigidly from one of said base portions toward the adjacent valve seat and having a head to engage the associated ball as the same is unseated, a tubular sleeve extending from the other base portion on the axes of the body members, a follower slidably mounted in said sleeve for axial movement toward and away from the associated valve seat and having a head constantly engaging the associated ball, the spring in the body member having said follower being braced between the base member and the head of the follower member and being stronger than the spring in the other body member whereby, when the body members are being connected, the stronger spring will force the ball in said other body member against the head of the stop member therein and that ball will then unseat the other ball and the balls will come to rest at equal distances from their respective valve seats, and the said heads being terminally recessed to center the balls on the axes of the bores through the body members.

2. A coupling for releasably connecting together conduits carrying fluid under pressure comprising cooperating cylindrical body parts each provided with a coaxial bore extending therethrough and having at one end a check ball seat, means releasably holding said parts in coupled relation with said seats in proximity, a check ball within each body part, springs normally urging said balls into said seats with portions of said balls protruding from the ends of said body parts whereby said balls will abut and unseat each other when said parts are coupled together and said springs maintaining the balls in contact when the parts are coupled, stationarily mounted means within one of said body parts for engaging and limiting the inward movement of its ball from its seat and so spaced from that seat that both balls are equally spaced from their respective seats when the parts are coupled, said means also operating to center the ball on said bores, a stationarily mounted guide in the other body part, a follower member axially guided in the guide in the guide and urged by the spring in that body part constantly into engagement with the ball therein, said follower member having means for holding the ball centered on the axis of the bores.

3. A coupling for releasably connecting together conduits carrying fluid under pressure comprising cooperating cylindrical body parts each provided with a coaxial bore extending therethrough and having at one end a check ball seat, means releasably holding said parts in coupled relation with said seats in proximity, a check ball within each body part, springs normally urging said balls into said seats with portions of said balls protruding from the ends of said body parts whereby said balls will abut and unseat each other when said parts are coupled together and the springs keeping the balls in contact when the parts are coupled, stationarily mounted means within one of said body parts engaging and limiting the inward movement of its ball from its seat and so spaced from that seat that both balls are equally spaced from their respective seats when the parts are coupled, said means also operating to center the ball on the axis of said bores, a stationarily mounted guide in the other body part, a follower member axially guided in the guide and urged by the spring in that body part constantly into engagement with the ball therein, said follower member having means for holding the ball centered on the axis of the bores, the spring engaging the follower member being stronger than the spring in the other body member for holding the balls against the stationary means in the other body part.

4. In a coupler having tubular body members arranged end to end and having aligned bores reduced in diameter at the facing ends of the members forming valve seats, a check valve ball in each bore, a stationary stop in one body member having means engaging the associated ball and centering the same on the axes of the bores, a spring engaging and urging that ball toward its seat, a stationary guide in the other body member, a follower slidable in the guide axially of the bores and having means engaging the associated ball and centering the same on the axes of the bores, and a spring engaging and urging the follower toward the associated valve seat, said spring being stronger than the spring engaging the ball in the other body member to urge both balls toward the stationary stop whereby the distance between that stop and the valve seats determines the spacing of both balls from their respective seats.

References Cited in the file of this patent

UNITED STATES PATENTS

| | | |
|---|---|---|
| 1,058,736 | Duey | Apr. 15, 1913 |
| 1,114,937 | Tessner | Oct. 27, 1914 |
| 1,137,551 | Taby et al. | Apr. 27, 1915 |
| 1,721,349 | Mitton | July 16, 1929 |
| 2,307,427 | Smith et al. | Jan. 5, 1943 |
| 2,359,648 | Jones | Oct. 3, 1944 |
| 2,405,864 | Vizay | Aug. 13, 1946 |
| 2,533,640 | Ulrich | Dec. 12, 1950 |

FOREIGN PATENTS

| | | |
|---|---|---|
| 632,025 | Great Britain | Nov. 15, 1949 |
| 863,055 | France | Jan. 23, 1940 |